United States Patent
Shimanouchi et al.

(10) Patent No.: US 12,328,219 B2
(45) Date of Patent: Jun. 10, 2025

(54) SYSTEMS AND METHODS FOR SUPPORTING BOTH PULSE AMPLITUDE MODULATION AND QUADRATURE AMPLITUDE MODULATION

(71) Applicant: Intel Corporation, Santa Clara, CA (US)

(72) Inventors: Masashi Shimanouchi, San Jose, CA (US); Hsinho Wu, Santa Clara, CA (US); Peng Li, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 750 days.

(21) Appl. No.: 17/358,982

(22) Filed: Jun. 25, 2021

(65) Prior Publication Data

US 2021/0328852 A1   Oct. 21, 2021

(51) Int. Cl.
*H04L 27/36* (2006.01)
*H04L 27/38* (2006.01)

(52) U.S. Cl.
CPC ............. *H04L 27/36* (2013.01); *H04L 27/38* (2013.01)

(58) Field of Classification Search
CPC ..... H04L 27/36; H04L 27/361; H04L 27/362; H04L 27/38; H04L 27/3818; H04L 27/3827; H04L 27/3836; H04L 27/366; H04L 27/367; H04L 27/365
See application file for complete search history.

(56) References Cited

U.S. PATENT DOCUMENTS

| | | | | |
|---|---|---|---|---|
| 6,973,141 B1* | 12/2005 | Isaksen | .................. | H04L 27/364 332/100 |
| 2008/0285685 A1* | 11/2008 | Chang | ..................... | H04L 27/38 375/324 |
| 2009/0135946 A1* | 5/2009 | Dowling | ............... | H04L 27/345 375/286 |
| 2011/0188613 A1* | 8/2011 | Dowling | ............... | H04L 1/0054 375/320 |
| 2016/0254939 A1* | 9/2016 | Miyazaki | ............ | H04L 27/3818 375/341 |

* cited by examiner

*Primary Examiner* — Khanh C Tran
(74) *Attorney, Agent, or Firm* — Fletcher Yoder, P.C.

(57) ABSTRACT

Systems and devices are provided for receiving or transmitting IQ data (e.g., suitable for passband quadrature amplitude modulation (QAM)) over a wireline using pairs of baseband pulse amplitude modulation (PAM-n) signals. Encoding circuitry may map data from an input bit stream to IQ data that includes an in-phase component and a quadrature-phase component. Modulator circuitry may determine an in-phase PAM-n signal based on the in-phase component and a quadrature-phase PAM-n signal based on the quadrature-phase component. Driver circuitry may transmit the in-phase PAM-n signal and the quadrature-phase PAM-n signal across a wireline channel. The in-phase PAM-n signal may be different by 90° from the quadrature-phase PAM-n signal. This may enable a remote receiver on the wireline channel to detect the in-phase PAM-n signal independently of the quadrature-phase PAM-n signal.

22 Claims, 12 Drawing Sheets

SYSTEMS AND METHODS FOR SUPPORTING BOTH PULSE AMPLITUDE MODULATION AND QUADRATURE AMPLITUDE MODULATION

BACKGROUND

This disclosure relates generally to wireline and wireless communication and, more specifically, to enabling in-phase and quadrature-phase (IQ) data to be used with different amplitude modulation processes for different types of channels.

Modern electronic devices such as computers, mobile phones, computer servers, and even vehicles communicate in a variety of ways. Wireline communication uses signal modulation to encode message information for high-speed wireline transmission. Wireline communication has historically used Pulse-Amplitude Modulation (PAM) to enable high-speed transmission. PAM communication uses pulses of different amplitudes that define multiple bits per pulse. PAM is often referred to as PAM-n, where n is often an integer value that is a power of 2 (e.g., PAM-2, PAM-4, and PAM-8) that refers to the number of different possible amplitudes that each pulse may have. Wireless communication uses a different form of signal modulation to encode message information for high-speed passband wireless transmission (e.g., over-the-air, coherent optical fiber communication). Wireless communication has historically used Quadrature Amplitude Modulation (QAM) to enable the high-speed wireless transmission. While effective for a variety of media that can support frequencies much higher than the desired data transfer rate, QAM involves additional processing overhead. Despite increasing demand for efficient communication between electronic devices, however, PAM-n may begin to falter when wireline transmission approaches 200 gigabytes per second per lane.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
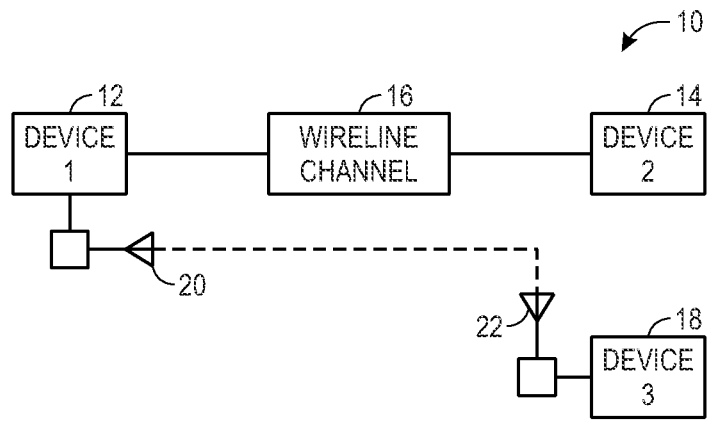
FIG. 1 is a system of electronic devices communicatively coupled through both wireline and wireless communication, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

Pulse Amplitude Modulation (PAM) communication uses pulses of different amplitude to define multiple bits per pulse. PAM is often referred to as PAM-n, where n is often an integer value that is a power of 2 (e.g., PAM-2, PAM-4, and PAM-8) that refers to the number of different possible amplitudes that each pulse may have. Thus, PAM-n uses n different symbols to enable high speed wireline transmission. PAM-2, a variant of PAM where one bit of information is carried with two possible signal levels, is often used for modulation for transmission of up to 50 gigabits/second in wireline transmission. PAM-4, a variant of PAM where two bits of information are carried with four possible signal levels, is used for modulation for transmission of 50 gigabits/second and above. The encoding and decoding between the information bits and the PAM-n symbols is relatively straightforward when n is an integer power of 2. However, when n is not an integer power of 2, the encoding and decoding may not be uniquely determined, involving trade-offs between latency and coding rate.

Quadrature Amplitude Modulation (QAM) is used to enable passband wireless communication (e.g., over-the-air (OTA), optical fiber). QAM is also IQ modulation, where an I component symbol stands for in-phase and a Q component symbol stands for quadrature-phase. The I component symbol and Q component symbol may be baseband signals generated by encoding input bits according to a QAM constellation to produce IQ data that includes the I component and the Q component. When the IQ data is used in accordance in a typical QAM format, the I component symbol and Q component symbol modulate the amplitudes of orthogonal passband carrier signals (e.g., sinusoidal signals). The modulated signal propagates through a wireless communication channel (e.g., over-the-air, optical fiber) and is received and demodulated. The orthogonality characteristics of the carrier signals are used to demodulate the modulated signal. The I component symbol and Q component symbols of the IQ data are then detected and decoded as received bits.

PAM has historically been used in wireline communication, perhaps because QAM has been more complicated and expensive. However, QAM may be used to provide transmission speed per lane of over 200 gigabits/second, in contrast to PAM-n since it may be difficult to do so using PAM-n symbols. This disclosure describes a form of PAM-n that uses IQ data to transfer higher quantities of data using baseband modulation (e.g., over a wireline channel), referred to herein as PAM/QAM. Indeed, the IQ data used in QAM-n may also be used with PAM-n in PAM/QAM. The IQ data may be based on a two-dimensional QAM constellation that can, in addition to representing a QAM-n encoding, may also represent a first PAM encoding in one dimension and a second PAM encoding in a second dimension. An example of a QAM-n constellation map that can be used to produce IQ data that could be used in QAM (e.g., for a passband wireless channel) or for PAM/QAM (e.g., for a baseband wireline channel) will be discussed further below.

Moreover, the presently disclosed embodiments enable utilization of a version of PAM-n where n is not an integer value of a power of 2 by establishing QAM-style wireline communication and exploiting the relationship between QAM and PAM-n. In particular, field programmable gate arrays (FPGAs) and/or configurable integrated circuits that provide wireline PAM-n function when n is not an integer power of 2, as well as the logical functionality behind the waveform-level modulation, may be compatible with a certain QAM. Moreover, PAM is generally used for wireline communication, and QAM is generally used for wireless communication. PAM/QAM communication as described in this disclosure may enable devices that have a high-speed serializer-deserializer (SerDes) to be fully utilized for either or both wireless and wireline communication.

For example, field programmable circuits (e.g., field programmable gate array (FPGA) devices or other devices with configurable serializer-deserializer (SerDes) circuits) and/or other integrated circuits may provide both wireline PAM-n transceiver functions (e.g., waveform-level modulation) and PAM/QAM baseband functions (e.g., IQ data) for external RF device(s) for wireless communication. Additionally, the hybrid architecture of this disclosure may be used in a low-latency repeater that bridges a PAM connector and a PAM/QAM connector whose logical functions are compatible (e.g., both QAM and PAM/QAM may use IQ data). Because both wireline and wireless communication may take place using the same IQ data, very low latency may be achieved by eliminating the conversion/translation of the logical functions of the IQ data into a different logical format.

With the foregoing in mind, FIG. 1 is a system 10 for communication through either or both wireline and wireless communication. The wireless communication may be passband over the air (OTA) communication and/or coherent optical fiber communication or any other suitable form of wireless communication. An electronic device 12 may communicate on wireline and wireless connections. An electronic device 14 is communicatively coupled to the electronic device 12 through a wireline connector 16 (e.g., PAM wired communication, PAM optical fiber communication). Furthermore, the electronic device 12 is communicatively coupled to an electronic device 18 through wireless communication using an antenna 20 and an antenna 22.

Each electronic device 12, 14, 18 in the system 10 may be able to use either or both wireline and wireless communication for the transmission of information. Architecture for wireline communication and architecture for wireless communication may involve different components for different types of modulation. In addition, hybridized architecture may be employed to combine the two functionalities into one system to be used by each electronic device 12, 14, 18 in the system 10.

Figure 2:
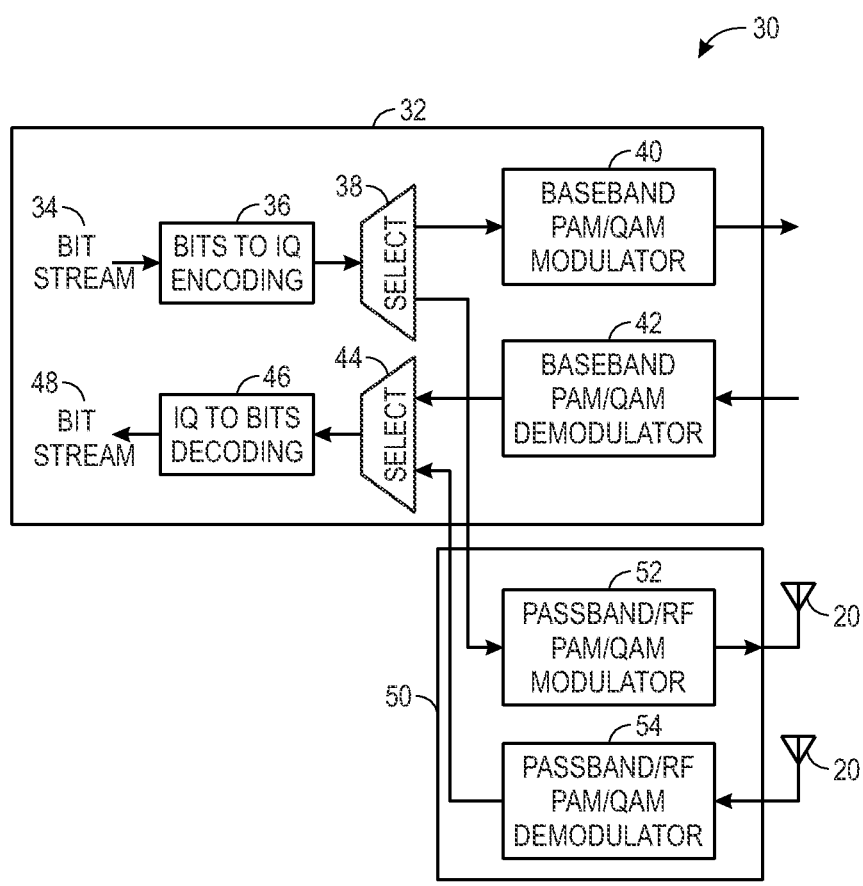
FIG. 2 is a block diagram of a hybrid architecture that may be used for wireline and wireless communication, in accordance with an embodiment.

With the foregoing in mind, FIG. 2 is a block diagram of a hybrid architecture 30 that may be used for wireline and wireless communication. The hybrid architecture 30 may be located within the electronic device 12, the electronic device 14, and/or the electronic device 18. Different types of integrated circuits (ICs) may execute each type of communication (e.g., wireline or wireless) and may be located within the same IC package. For example, an IC for baseband and an IC for passband may be located within the same package and, further, within the same hybrid architecture 30. Additionally or alternatively, a single integrated circuit may contain circuitry for both wireline and wireless communication. In some cases, different aspects of the system may be carried out using a system configuration programmed into a field programmable gate array (FPGA).

In the example of FIG. 2, a baseband IC 32 receives an input bit stream 34 to an encoding circuitry 36. The encoding circuitry 36 maps the bit stream 34 into I and Q components (IQ) according to a QAM constellation, where the I component symbol is an in-phase component and the Q component symbol is a quadrature-phase component. An in-phase (I) component is a signal that is in one phase position and its quadrature phase (Q) counterpart is a signal which differs in phase by 90 degrees (e.g., 90° ahead or 90° behind of the in-phase component). The encoding circuitry 36 performs this type of encoding using the bit stream 34 to generate IQ data suitable for transmission in wireline or wireless communication. The encoding circuitry 36 provides I component symbols and Q component symbols of the IQ data to a multiplexer 38 (e.g., a selector), which selects where to transmit the IQ components symbols based on a transmitter communication mode of the hybrid architecture 30 (e.g., wireless mode or wireline mode, baseband mode or passband mode). It should be noted that baseband corresponds to wireline communication and passband corresponds to wireless communication.

When the transmitter communication mode is set to a first mode (e.g., wireline mode or baseband mode), the multiplexer 38 provides the IQ data to a baseband modulator 40.

The baseband modulator 40 modulates the IQ components of the IQ data using PAM-n modulation. The baseband modulator 40 outputs the modulated IQ components as pairs of PAM-n signals to another device through the wireline connector 16. The hybrid architecture 30 receives a modulated IQ component signal from another device and demodulates the signal with a baseband demodulator 42. The baseband demodulator 42 provides demodulated IQ components as a first input into a multiplexer 44. The multiplexer 44 outputs the demodulated IQ components of received IQ data based on a receiving communication mode (e.g., wireless mode or wireline mode, baseband mode or passband mode) of the hybrid architecture 30. The demodulated IQ components of received IQ data are received by decoding circuitry 46, where the decoding circuitry 46 decodes the demodulated IQ components into an output bit stream 48.

When the transmitter communication mode is set to a second mode (e.g., wireless mode, passband mode), the multiplexer 38 provides the IQ components to a passband IC 50. The passband IC 50 may be an external IC (e.g., a chiplet) in the same package as the baseband IC 32. A passband modulator 52 receives the IQ components and modulates the IQ components according to any suitable QAM techniques. The passband modulator 52 may output the modulated IQ components of the IQ data as a signal over wireless communication to another device using the antenna 20. As described above, the antenna 20 may include a transceiver to transmit and receive the modulated IQ component signals of IQ data. Thus, the hybrid architecture 30 may also receive QAM modulated IQ component signals of IQ data from another device by way of the antenna 20. The QAM modulated IQ data may be demodulated by a passband demodulator 54. The passband demodulator 54 provides the demodulated IQ components of the IQ data to the multiplexer 44. When the receiving mode is set to the second mode (e.g., passband mode, wireless mode), the multiplexer 44 outputs the demodulated IQ components of the received IQ data to decoding circuitry 46. The decoding circuitry 46 may decode the IQ data into a bit stream 48.

Modulating a signal is the process of imposing an input signal (e.g., I or Q signal) on a carrier wave (e.g., a sinusoidal wave). This effectively amounts to multiplying the input signal with the carrier wave. Demodulating a signal operates in the reverse. For QAM, a frequency of carrier wave used for QAM is higher than the I/Q symbol rate ($f_b$) such that multiple carrier cycles exist in each modulation symbol and the orthogonality of the I component symbol and the Q component symbol is realized. Each modulation symbol is the duration of a pulse in the input signal. By way of example, if the carrier frequency is double the input signal frequency, then there are two carrier cycles per modulated symbol. In other words, the integration time may amount to multiple cycles of a carrier wave, which is suitable for transmitting over a wireless channel that may support a substantially higher carrier wave frequencies than wireline.

Figure 3:
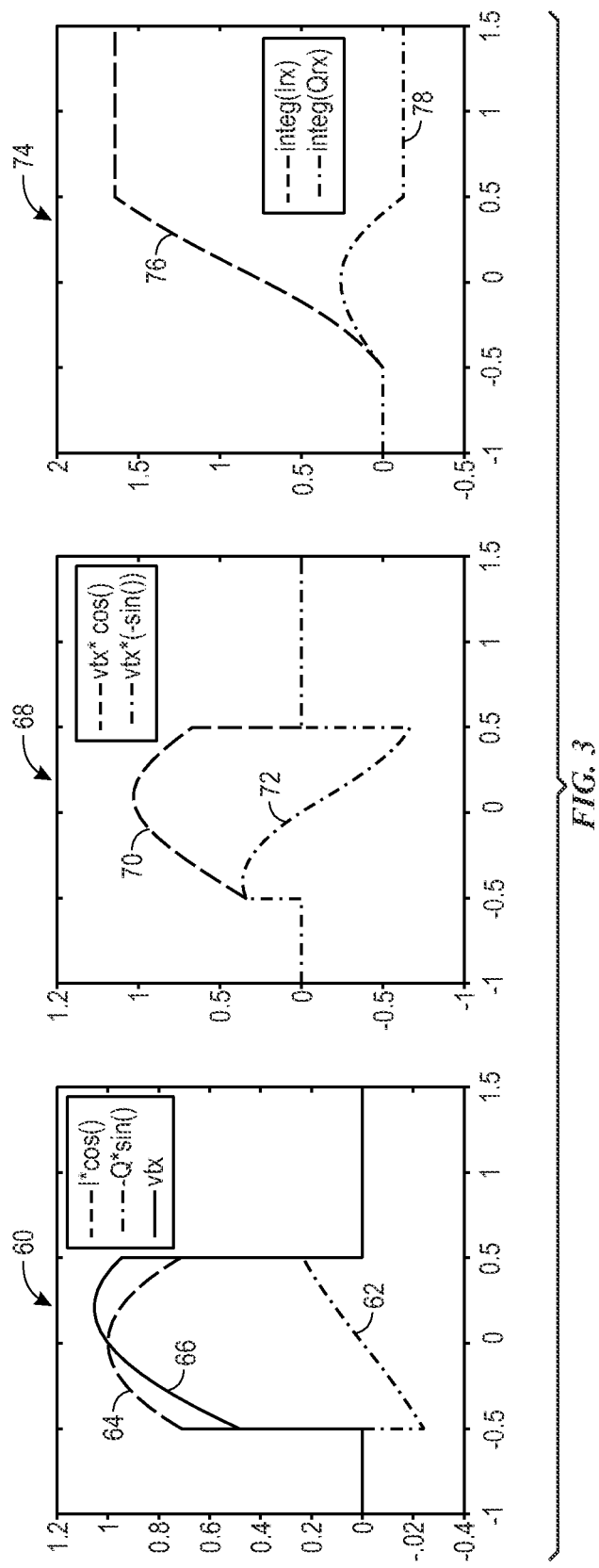
FIG. 3 illustrate graphs displaying the modulation and demodulation process when a carrier frequency $f_b$ is a half of symbol frequency, in accordance with an embodiment.

However, wireline communication is a frequency bandwidth limited system, and therefore a lower carrier frequency may be used. This may lead to issues with QAM modulation over wireline, where the usual QAM modulation may fail when the carrier frequency is less than the I/Q symbol rate divided by 2 ($f_b/2$). With the foregoing in mind, FIG. 3 illustrates graphs displaying the modulation and demodulation process when the carrier frequency $f_b$ is less than or equal to half the symbol frequency. The graphs of FIG. 3 illustrate why traditional QAM may not be functional when the carrier frequency $f_b$ is less than or equal to half the symbol frequency.

A graph 60 illustrates the modulation of IQ component symbols when the carrier wave frequency is equivalent to a fourth of the IQ component symbol frequency. The graph 60 may have an x-axis corresponding to the modulation symbol unit time interval and a y-axis corresponding to the signal amplitude. It should be noted that the graphs illustrated in FIG. 3 correspond to the I component symbol equivalent to 1 unit of time and the Q component symbol equivalent to −⅓ (−0.33) unit of amplitude and further illustrates how each component is modulated with a cosine sinusoid and a sine sinusoid, respectively. The transmitter output signal vtx may be the sum of the two modulated sinusoids.

In graph 60, graph line 62 is the modulated Q symbol, graph line 64 is the modulated I symbol, and graph line 64 is the sum of the two modulated symbols. As is observed when comparing the graph line 62 and the graph line 64, the orthogonality of the I component symbol and the Q component symbol is lost with this relationship (e.g., when I=1, Q=−0.33). Thus, the signal may not be correctly modulated and there may be data lost from the original bit stream in the modulation circuit.

FIG. 3 further illustrates a graph 68 and a graph 74, which show a first step of demodulation and a second step of demodulation, respectively. Graph line 70 and graph line 72 of graph 68 are lines illustrating the multiplication of the received signal with the carrier wave, where the graph line 70 corresponds to the received signal multiplied with a cosine carrier wave and the graph line 72 corresponds to the received signal multiplied with a sine carrier wave. Graph line 70 and graph line 72 are lines illustrating the result of the graph line 70 and the graph line 72 integrated over the modulation symbol time. Both the graph 68 and the graph 74 further illustrate how the two waves are non-orthogonal when the carrier frequency is less than half the symbol frequency.

By illustrating the issue when using QAM modulation in baseband communication, a conclusion may be reached when considering the case when the I component symbol is equivalent to 1 unit interval (UI) and the Q component symbol is equivalent to 1 (or −1) unit interval (UI) with the same carrier frequency to symbol frequency ratio.

Figure 4:
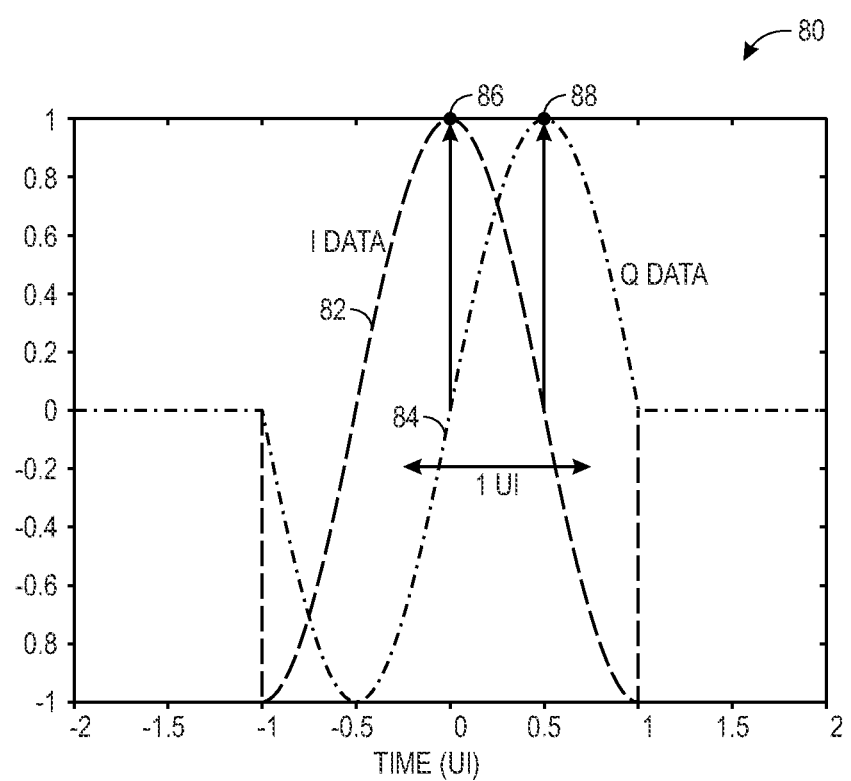
FIG. 4 illustrates a graph to show two points at which the modulation of two respective symbols is unaffected by the other symbol, in accordance with an embodiment.

With the foregoing in mind, FIG. 4 illustrates of a graph 80 to show two points when the modulation of each symbol is unaffected by the other symbol (e.g., the modulation of the I component symbol is not affected by the modulation of the Q component symbol, and vice-versa). A graph 80 may have a graph line 82 corresponding to when the modulated I-symbol matches a cos-basis carrier wave element and a graph line 84 when the modulated Q component symbol matches a sin-basis carrier wave element. It may be observed that at point 86, the Q component symbol modulation does not affect the I component symbol modulation at t=0 UI, and at point 88, the I modulation does not affect the Q component symbol modulation at t=0.5 UI. Though the I/Q orthogonality in usual sense does not hold at f0=fb/2, this characteristic allows detection of the I element and the Q element independently. The points 86 and 88 have a time separation of 0.5 UI. This may be difficult to implement at the leading-edge electrical baseband (e.g., wireline) modulation and demodulation; thus, the time separation of 1 UI may be selected as the smallest in practice in some embodiments.

Furthermore, it may be interpreted that one QAM symbol is represented by two consecutive symbols: an I-symbol and a Q-symbol. It has been determined that, for the PAM/QAM communication of this disclosure, each symbol may be treated as a PAM symbol. In some embodiments, the order of the two symbols may be opposite. Thus, baseband QAM, where QAM modulation is used for wireline communication, is baseband QAM modulation formed from consecutive PAM symbol modulation. This type of baseband QAM is also referred to herein as PAM/QAM.

Figure 5:
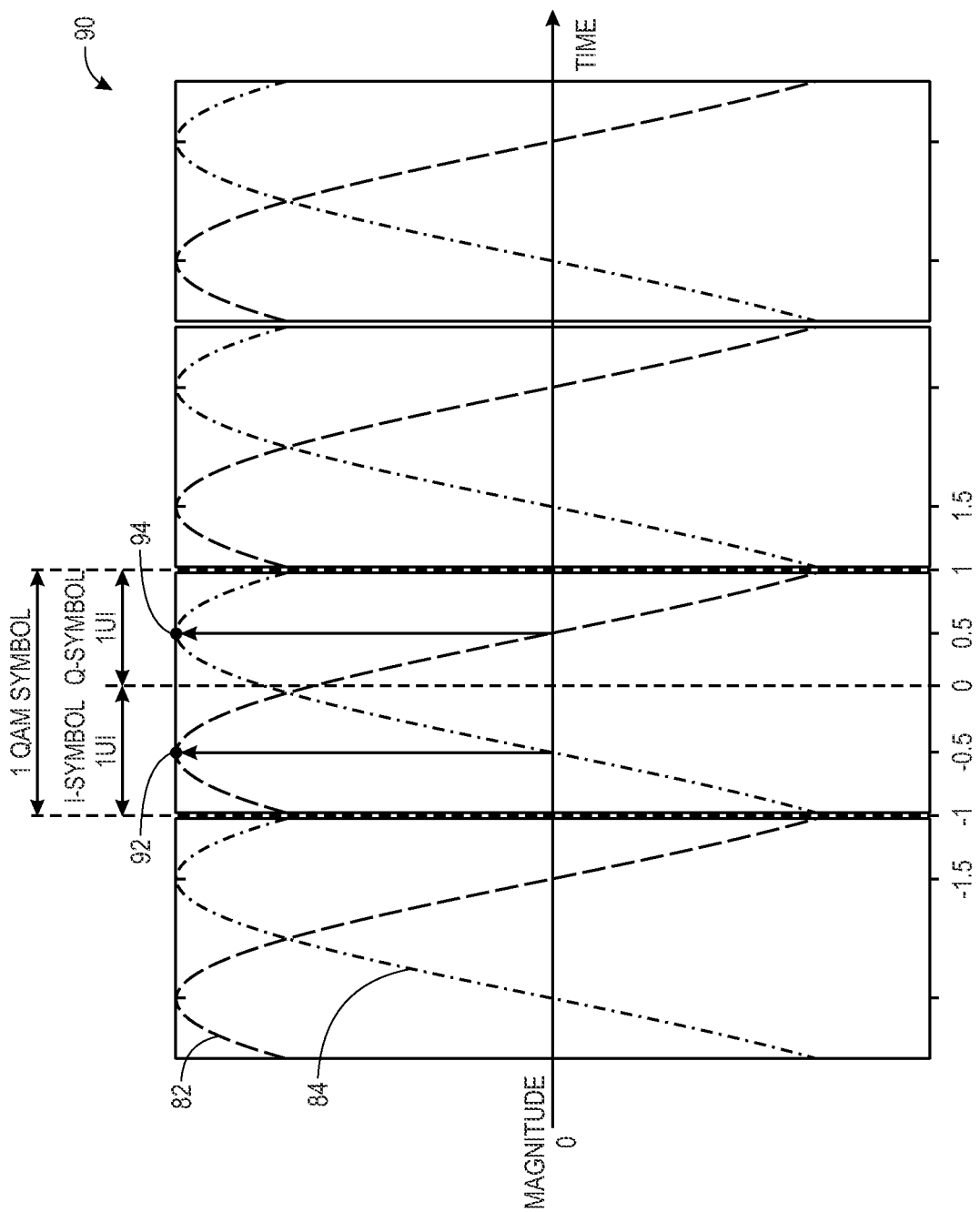
FIG. 5 illustrates a graph illustrating a QAM symbol as consecutive PAM symbols, in accordance with an embodiment.

With the foregoing in mind, FIG. 5 is a graph 90 illustrating a QAM symbol (I, Q) formed from consecutive PAM symbols. As described above, the graph line 82 corresponding to when the modulated I symbol matches a cos-basis carrier wave element and the graph line 84 when the modulated Q symbol matches a sin-basis carrier wave element. For each symbol (e.g., the I symbol and the Q symbol), a time separation of 1 UI is used to form the QAM symbol. That is, when sampling the I symbol for 1 UI, there is no sampling of the Q symbol. Additionally, when sampling the Q symbol at another 1 UI, there is no sampling of the I symbol.

Indeed, this may enable technologies developed for QAM to be used for PAM-n where n is not an integer power of 2. For example, there is no natural and unique mapping between information bits and the modulation symbols for traditionally defined PAM-6. However, it is possible to use the mapping developed for QAM-32 and transmit the information with two consecutive PAM-6 symbols (I-PAM-6 and Q-PAM-6). While QAM-32 is described by way of example here, any suitable QAM-n constellation may be used to encode or decode IQ data.

Figure 6:
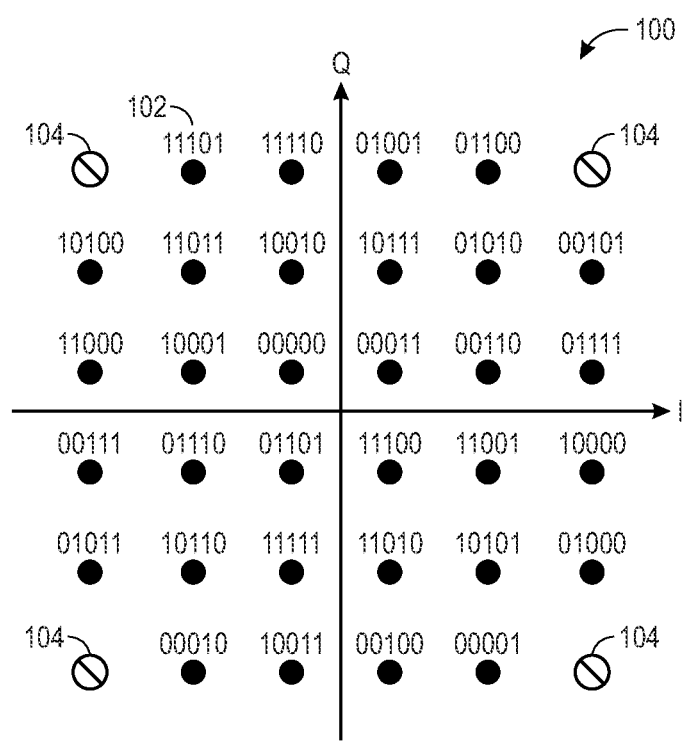
FIG. 6 illustrates an example constellation diagram for QAM-32, in accordance with an embodiment.

With the foregoing in mind, FIG. 6 illustrates a constellation diagram 100 for QAM-32. Data points (I,Q) are often described by a constellation diagram. The constellation diagram 100 is a representation of a signal modulated by quadrature amplitude modulation (QAM) or pairs of pulse amplitude modulation (PAM/QAM). It displays the signal as a two-dimensional xy-plane scatter diagram in the complex plane at symbol sampling data points. Each data point 102 represents an (I/Q) coordinate of the normalized signal. In the case of FIG. 6, the four (I,Q) corners 104 of QAM-36 are removed for QAM-32. This effectively forms a QAM-32 constellation diagram through utilization of PAM-6 by PAM-6. This may further show that the QAM symbol is consecutive PAM symbols.

As mentioned above, QAM-32 is described by way of example, but any suitable constellation may be used to encode or decode IQ data. Moreover, other constellations may be represented by PAM-n by PAM-n of equal or unequal numbers n (e.g., PAM-3 by PAM-3, PAM-3 by PAM-2). Moreover, other constellations may be lower or higher (e.g., QAM-64 represented as PAM-8 by PAM-8, QAM-128 represented by PAM-12 by PAM-12, or the like).

Figure 7:
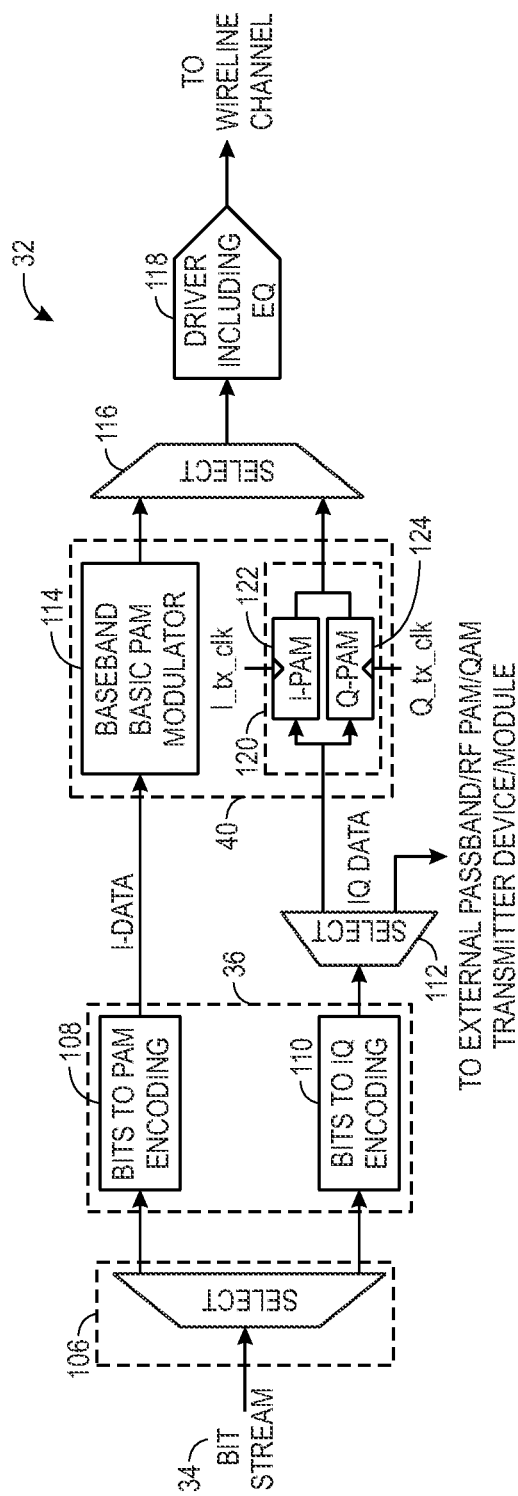
FIG. 7 is a block diagram of encoding and modulating components of a baseband IC within the hybrid architecture of FIG. 2, in accordance with an embodiment.

Referring back to FIG. 2, the block diagram of the hybrid architecture 30 simplifies the components of the baseband IC 32 and the passband IC 50. With the foregoing in mind, FIG. 7 is a block diagram of the encoding and modulating components of the baseband IC 32. The bit stream 34 is received by the encoding circuitry 36, where the encoding circuitry 36 connects to a multiplexer 106 that receives the bit stream 34. The multiplexer 106 may select to transmit the bit stream 34 into a PAM encoding circuitry 108 or QAM encoding circuitry 110 located within the encoding circuitry 36 based on a modulation mode. For wireline, the modulation mode may be either PAM/QAM modulation mode or PAM modulation mode.

When the modulation mode is set to PAM modulation, the multiplexer 106 may transmit the bit stream 34 to the PAM encoding circuitry 108. The PAM encoding circuitry 108 may encode the entire bit stream 34 as a series of single-symbol PAM data. Here, the encoded PAM data may be referred to as I-data (e.g., in-phase I-symbols) to distinguish it from the pair of PAM signals used in PAM/QAM (I-data and Q-data—IQ data). That is, while the PAM encoding circuitry 108 does not encode Q-data, this does not imply that any of the bit stream is lost, but rather that the entire bit stream is encoded by the PAM encoding circuitry 108 as I-data using single-symbol PAM. The PAM encoding circuitry 108 may transmit the I-data to the baseband modulator 40. The baseband modulator 40 may include a baseband basic PAM modulator 114. The baseband basic PAM modulator 114 may perform normal PAM modulation on PAM-n symbols. In general, this is a form of PAM-n where the integer n is an integer power of 2. The baseband basic PAM modulator 114 may transmit the modulated I-data to a multiplexer 116, which selects to transmit the modulated I-data into driver circuitry 118 based on the modulation mode. The driver circuitry 118 may include equalizer circuitry (EQ) to modify the gain or frequency or filter the incoming modulated data. The driver circuitry 118 then provides a PAM waveform based on the I-data to another electronic device through the wireline connecter 16.

When the modulation mode is set to PAM/QAM modulation, the multiplexer 106 may transmit the bit stream 34 into the QAM encoding circuitry 110, which may encode the bit stream 34 as IQ data (e.g., I-symbols and Q-symbols) and transmit the IQ data to a multiplexer 112. The multiplexer 112 may transmit the IQ data based on the communication mode (e.g., wireline or wireless). When the communication mode is set to wireline, the multiplexer 112 may transmit the IQ data to the baseband modulator 40, which may include a baseband PAM/QAM modulator 120; otherwise, when the communication mode is set to wireless, the multiplexer 112 may transmit the IQ data to the passband modulator (not shown) that may use any suitable modulation (e.g., QAM) to transmit the IQ data over a wireless channel. In this way, both wireline and wireless modulation may use the IQ data from the QAM encoding circuitry 110 even though the modulation (PAM vs. QAM) may differ for wireline and wireless communication. Sharing the QAM encoding circuitry 110 to generate the IQ data in this way may reduce the area of the circuitry involved in transmission and reception for high-speed communication.

In the wireline PAM/QAM mode, the baseband PAM/QAM modulator 120 may perform the modulation described with reference to FIG. 5 or 6. This may enable wireline transmission of IQ data through modulation of PAM-n symbols even when the integer n is not a power of 2. The baseband PAM/QAM modulator 120 may include a I-symbol PAM modulation block 122 and a Q-symbol PAM modulation block 124. The I-symbol PAM modulation block 122 may receive a transmitter I-symbol clock signal I_tx_clk and the Q-symbol PAM modulation block 124 may receive a transmitter Q-symbol clock signal Q_tx_clk that is offset in phase by 90° ($\pi/2$ radians) from the transmitter I-symbol clock signal I_tx_clk. The baseband PAM/QAM modulator 120 transmits the modulated IQ data to a multiplexer 116, may transmit the modulated IQ data into the driver circuitry 118 based on the modulation mode (PAM or PAM/QAM). The driver circuitry 118 provides a PAM/QAM waveform to another electronic device through the wireline connecter 16.

Figure 8:
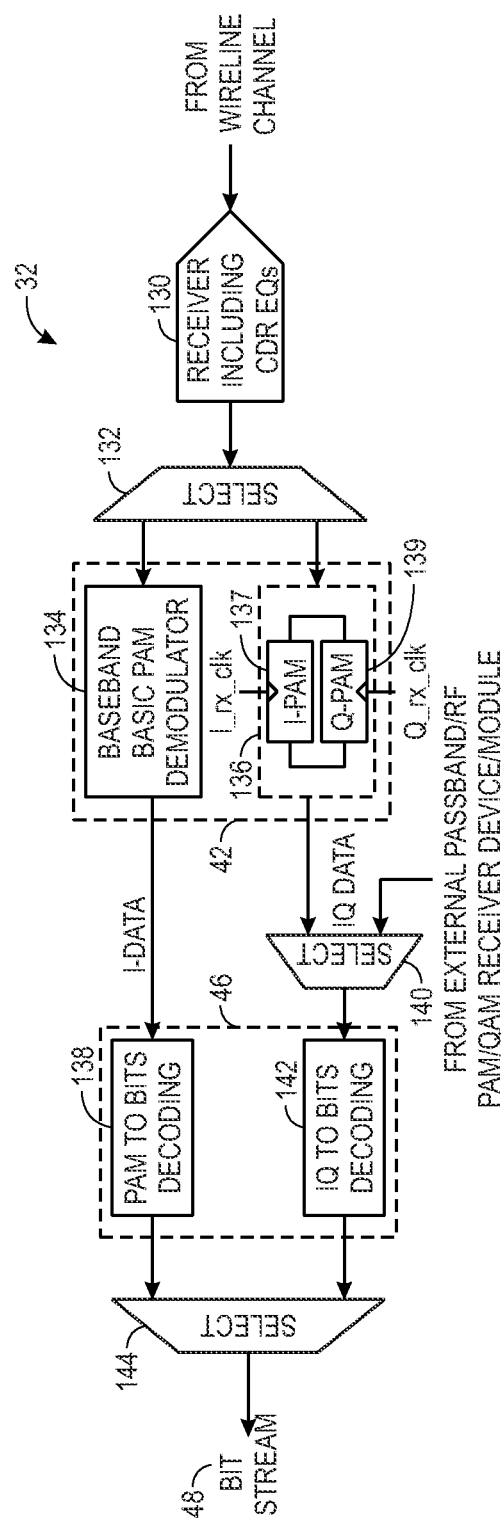
FIG. 8 is a block diagram of decoding and demodulating components of the baseband IC within the hybrid architecture of FIG. 2, in accordance with an embodiment.

FIG. 8 is a block diagram of the decoding and demodulating aspects of the baseband IC 32. The baseband IC 32 may include a receiver 130 to receive data through the wireline connector 16 from another electronic device. The receiver 130 may include equalizer circuitry and clock and data recovery (CDR) circuitry. The CDR circuitry extracts timing information from a data stream and provides the timing information to the rest of the baseband IC 32. The receiver 130 may transmit the received data to a multiplexer 132, which may select to transmit the received data into PAM demodulating circuitry 134 or PAM/QAM demodulating circuitry 136 based on a demodulation mode. The demodulation mode may include a PAM demodulation mode or a PAM/QAM demodulation mode.

When the demodulation mode set to the PAM demodulation mode, the multiplexer 132 may transmit the received data into the PAM demodulating circuitry 134. The PAM demodulating circuitry 143 may demodulate the received data into I-data (e.g., I-symbols). The PAM demodulating circuitry 134 transmits the I-data to the decoding circuitry 46, which includes PAM decoding circuitry 138. The PAM decoding circuitry 138 may decode the I-data into a decoded bit stream and transmit the decoded bit stream to a multiplexer 144. The multiplexer 144 may select and output the bit stream 48 based on the demodulation mode.

When the demodulation mode is set to the PAM/QAM demodulation mode, the multiplexer 132 may transmit the received data into the PAM/QAM demodulating circuitry 136, which demodulates the received data into IQ data (e.g., I symbols and Q symbols). The PAM/QAM demodulating circuitry 136 may transmit the IQ-data to a multiplexer 140, which selects and transmits IQ-data into the decoding circuitry 46 based on the communication mode. The PAM/QAM demodulating circuitry 136 may include an I-symbol PAM demodulation block 137 and a Q-symbol PAM demodulation block 139. The I-symbol PAM demodulation block 137 may receive a receiver I-symbol clock signal I_rx_clk and the Q-symbol PAM demodulation block 139 may receive a receiver Q-symbol clock signal Q_rx_clk that is offset in phase by 90° ($\pi/2$ radians) from the receiver I-symbol clock signal I_rx_clk. Each respective clock signal is used to align each respective symbol. The decoding circuitry 46 may additionally include PAM/QAM decoding circuitry 142, which decodes the IQ data into the decoded bit stream. The PAM/QAM decoding circuitry 142 may transmit the decoded bit stream to the multiplexer 144. The multiplexer 144 may select and output the bit stream 48 based on the demodulation mode.

When baseband wireline PAM/QAM connectors and wireless QAM connectors have a compatible logical functionality behind their waveform-level modulation/demodulation, connecting one connector to another is transparent at IQ data level, and therefore its latency is reduced significantly. This enables very low latency repeaters and/or bridge devices that may extend an original connector as described below.

Figure 9A:
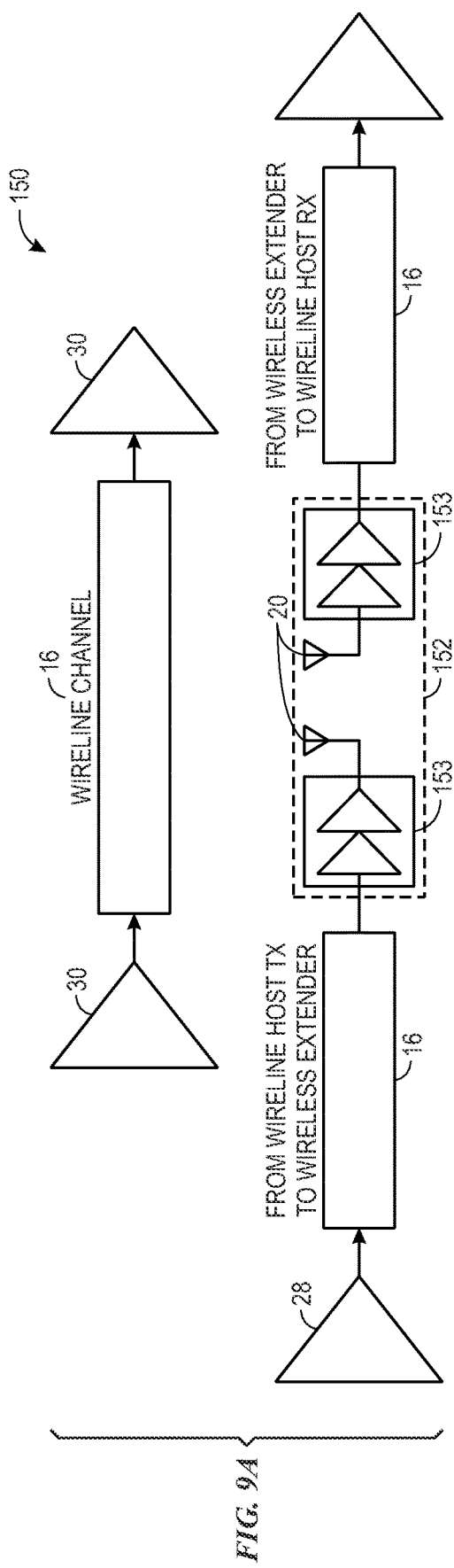
FIG. 9A is an illustrated example of an extended wireline connector with wireless extenders, in accordance with an embodiment.

For example, FIG. 9A is an illustrated example of an extended wireline connector 150 with a wireless extension system 152. To extend the wireline connector 16, the wireless extension system 152 may be inserted between two wireline connectors 16. The original wireline connector 16 design uses two devices 30 and the wireline connector 16. In place of a single wireline channel 16, the wireless extension system 152 may use a wireless channel. The wireless channel may use two antennas 20 to form the extended wireline connector 150. In particular, within the wireless extension system 152, an amplifier 153 coupled to the antenna 20 may communicate with another antenna 20 connected to another amplifier 153. Effectively, however, the low-latency wireless extension system 152 behaves as the wireline channel since IQ data may be transmitted without decoding from the input wireline channel 16 to the wireless extension system 152 to the output wireline channel 16. Indeed, only the form of modulation of the IQ data changes (from PAM/QAM along the input wireline channel 16 to QAM along the wireless channel between the antennas 20 back to PAM/QAM along the output wireline channel 16).

Figure 9B:
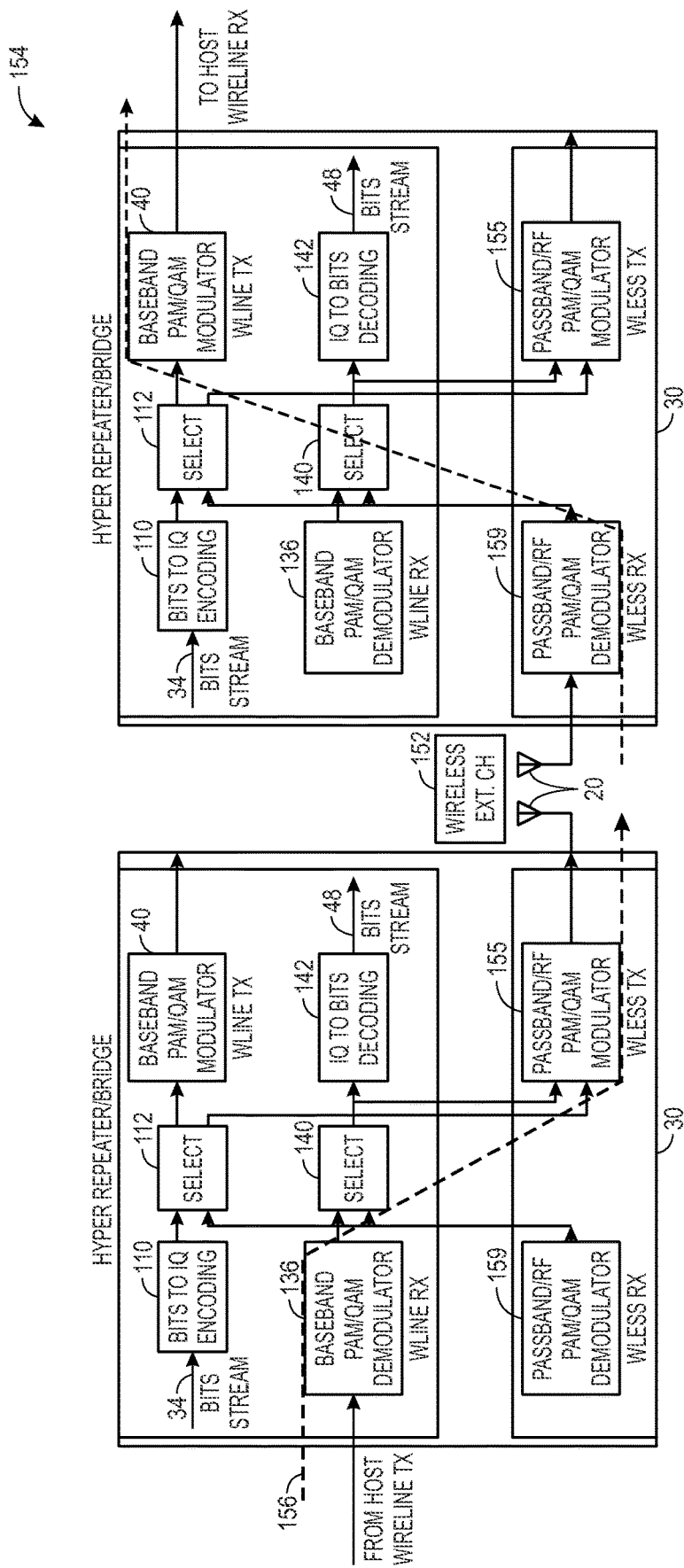
FIG. 9B illustrates a signal flow illustrating a data input into a baseband PAM/QAM demodulator to a passband PAM/QAM modulator into the wireless extender, in accordance with an embodiment.

FIG. 9B is an illustration of a multi-device configuration 154 and a signal flow 156 for the wireless extension system 152. The multi-device configuration 154 illustrates the signal flow 156 between the host wireline transmitters to a host wireline receiver. As shown in FIG. 9B, a signal flow 156 illustrates the data input into the baseband PAM/QAM demodulator 136 to a passband PAM/QAM modulator 155 into the wireless extension system 152. The signal flow 156 further illustrates the data being received at a passband PAM/QAM demodulator 159 to the baseband PAM/QAM modulator 40.

Figure 10A:
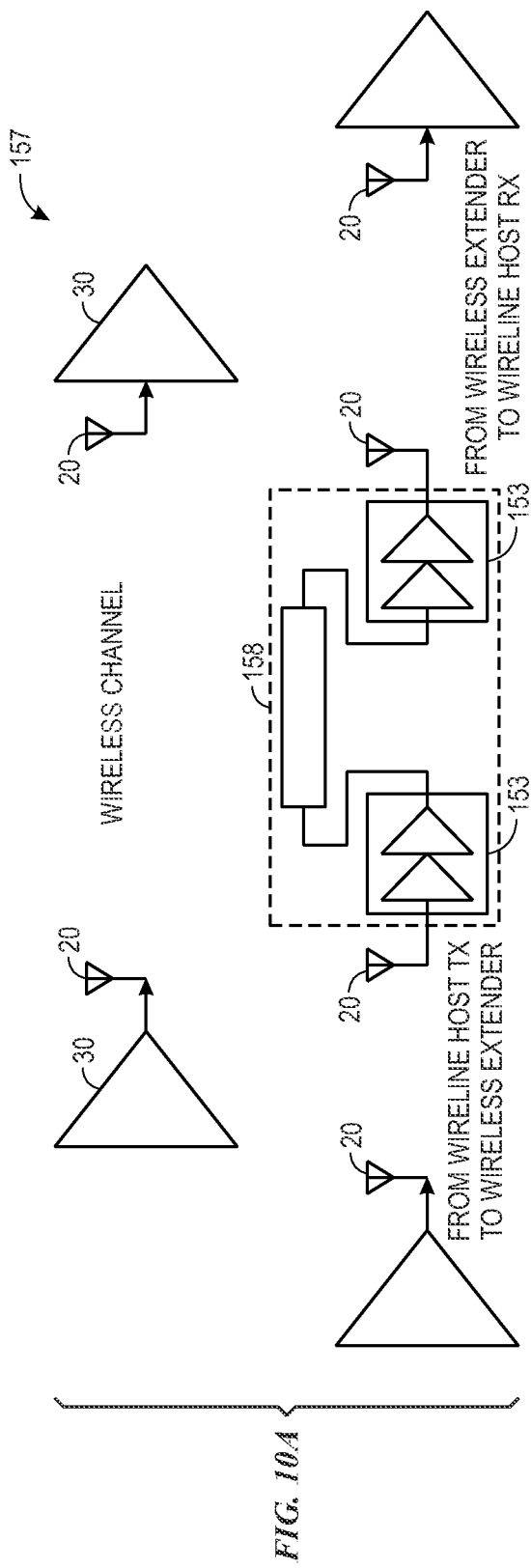
FIG. 10A is an illustrated example of an extended wireless connector with a wireline extender, in accordance with an embodiment.
Figure 10B:
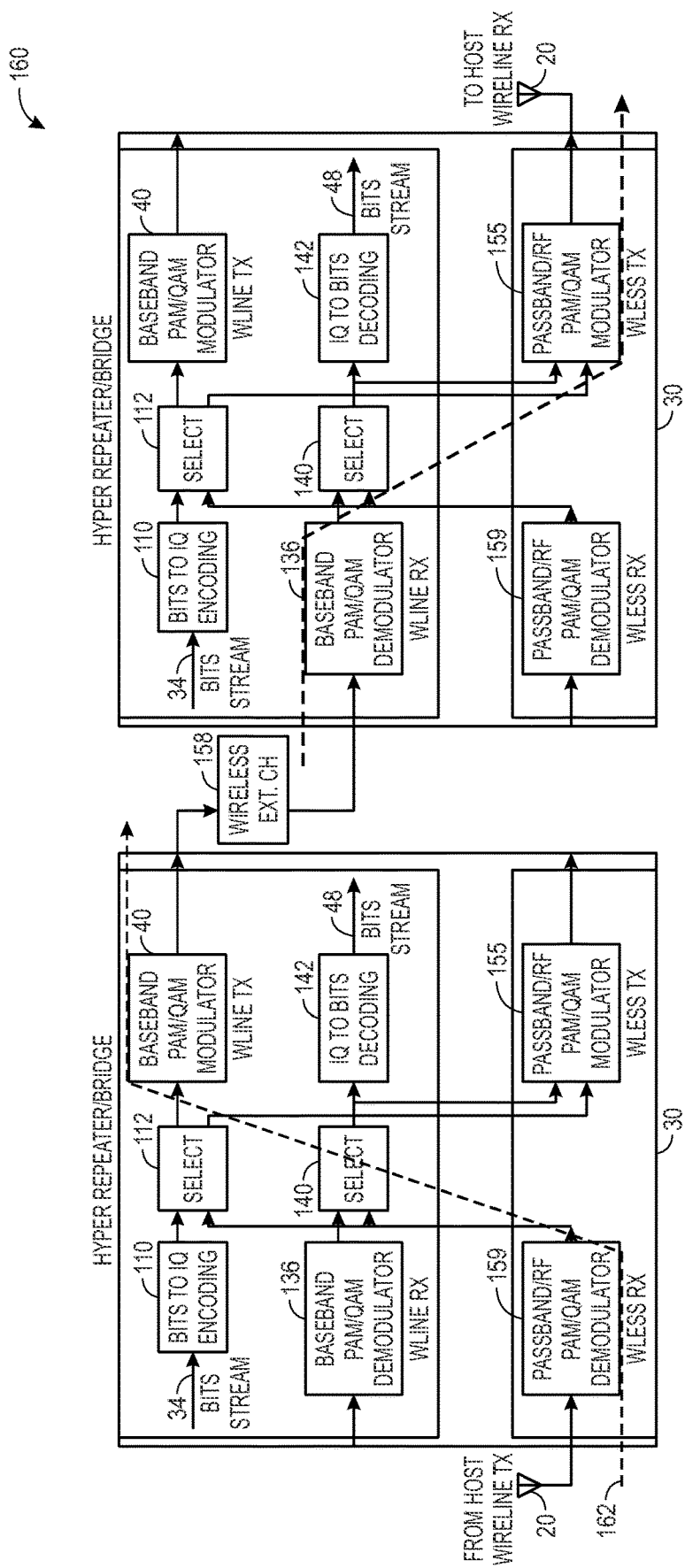
FIG. 10B is an illustration of a multi-device configuration and a signal flow, in accordance with an embodiment.

FIG. 10A is an illustrated example of an extended wireless connector 157 with a wireline extension system 158. The original wireless connector design uses two devices and the antennas 20. The wireless connector 157 may be extended by inserting the wireline extension system 158. The wireline extension system 158 may include an internal wireline channel connected to antennas 20 to form the extended wireless connector 157. With this in mind, FIG. 10B is an illustration of a multi-device configuration 160 and a signal flow 162. The multi-device configuration 160 illustrates the signal flow 162 between a host wireless transmitter to a host wireless receiver. As shown in FIG. 10B, the signal flow 162 illustrates the data input into the passband PAM/QAM demodulator 159 to the baseband PAM/QAM modulator 40 into the wireline extension system 158. The signal flow 162 further illustrates the data being received at the baseband PAM/QAM demodulator 136 and flows to the passband PAM/QAM modulator 155.

By employing the techniques described in the present disclosure, the hybrid architecture 30 may enable wireline PAM-n function even when n is not an integer power of 2, and the logical functionality behind the waveform-level modulation may be compatible with a certain QAM. Further, the hybrid architecture 30 may enable both wireline PAM-n transceiver function and PAM/QAM baseband function for external RF device(s) for wireless communication using the baseband IC 32 and the passband IC 50. Moreover, the one or more electronic devices of the system 10 may use a wireline extender 152 and/or a wireless extender 158 to enable low latency repeater or bridge that bridges PAM and QAM functionality whose logical functions are compatible.

Figure 11:
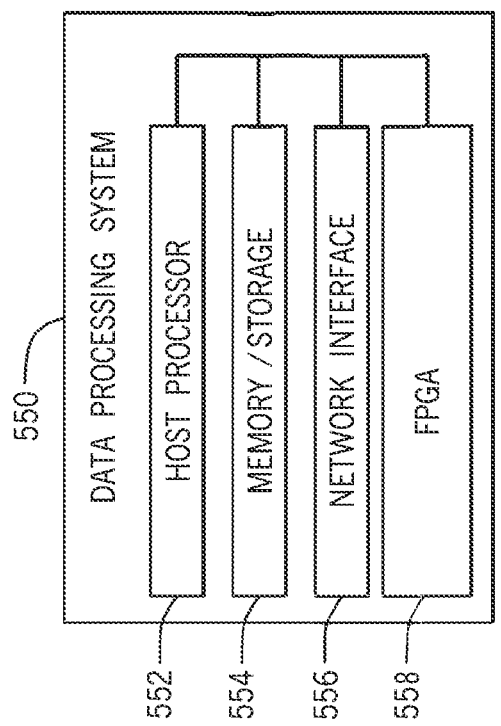
FIG. 11 is an example of a data processing system that may employ PAM/QAM communication, in accordance with an embodiment.

Bearing the foregoing in mind, the PAM/QAM communication circuitry may be integrated into a data processing system or may be a component included in a data processing system. For example, as shown in FIG. 11, a data processing system 550 may include a host processor 552, memory and/or storage circuitry 554, and a network interface 556. In the example of FIG. 11, the data processing system 550 includes a field-programmable gate array (FPGA) circuit 558, but the FPGA circuit 558 may not be present in some examples. Indeed, the data processing system 550 may include more or fewer components (e.g., electronic display, user interface structures, application specific integrated circuits (ASICs)). The host processor 552 may include any processor to manage a data processing request for the data processing system 550 (e.g., to perform encryption, decryption, machine learning, video processing, voice recognition, image recognition, data compression, database search ranking, bioinformatics, network security pattern identification, spatial navigation, cryptocurrency operations, or the like). The memory and/or storage circuitry 554 may include random access memory (RAM), read-only memory (ROM), one or more hard drives, flash memory, or the like. The memory and/or storage circuitry 554 may hold data to be processed by the data processing system 550. In some cases, the memory and/or storage circuitry 554 may also store configuration programs (bitstreams) for programming the FPGA circuit 558. The network interface 556 may allow the data processing system 550 to communicate with other electronic devices using PAM, PAM/QAM, and/or QAM as discussed above. The rapid communication enabled by network interface 556 may enable the data processing system 550 to perform rapid operations from great distances. The data processing system 550 may include several different packages or may be contained within a single package on a single package substrate. For example, components of the data processing system 550 may be located on several different packages at one location (e.g., a data center) or multiple locations. For instance, components of the data processing system 550 may be located in separate geographic locations or areas, such as different rooms, buildings, cities, states, or countries and connected to one another via PAM, PAM/QAM, and/or QAM using the communication circuitry discussed above.

In one example, the data processing system 550 may be part of a data center that processes a variety of different requests. For instance, the data processing system 550 may receive a data processing request via the network interface 556 to perform encryption, decryption, machine learning, video processing, voice recognition, image recognition, data compression, database search ranking, bioinformatics, network security pattern identification, spatial navigation, digital signal processing, or some other specialized task. Many aspects of these tasks may be enabled through the use of PAM/QAM as discussed in this disclosure, which may permit large amounts of data to be transferred at low latencies.

While the embodiments set forth in the present disclosure may be susceptible to various modifications and alternative forms, specific embodiments have been shown by way of example in the drawings and have been described in detail herein. However, the disclosure is not intended to be limited to the particular forms disclosed. The disclosure is to cover all modifications, equivalents, and alternatives falling within the spirit and scope of the disclosure as defined by the following appended claims.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

EXAMPLE EMBODIMENTS

The following define certain example embodiments of the present disclosure.

Example Embodiment 1. An electronic device comprising:

encoding circuitry to map data from an input bit stream to IQ data comprising an in-phase component and a quadrature-phase component;

modulator circuitry to determine an in-phase pulse amplitude modulation signal based on the in-phase component and a quadrature-phase pulse amplitude modulation signal based on the quadrature-phase component, wherein the in-phase pulse amplitude modulation signal is different by 90° from the quadrature-phase pulse amplitude modulation signal; and driver circuitry to transmit the in-phase pulse amplitude modulation signal and the quadrature-phase pulse amplitude modulation signal across a wireline channel, wherein the in-phase pulse amplitude modulation signal is different by 90° from the quadrature-phase pulse amplitude modulation signal to enable a remote receiver on the wireline channel to detect the in-phase pulse amplitude modulation signal independently of the quadrature-phase pulse amplitude modulation signal.

Example Embodiment 2. The device of example embodiment 1, wherein the encoding circuitry maps the data from the input bit stream to the IQ data according to a QAM-n constellation map.

Example Embodiment 3. The device of example embodiment 2, wherein the QAM-n constellation map corresponds to a first PAM-n encoding corresponding to the in-phase component of the IQ data and a second PAM-n encoding corresponding to the quadrature-phase component of the IQ data.

Example Embodiment 4. The device of example embodiment 3, wherein the first PAM-n encoding or the second PAM-n encoding, or both, comprise a version of PAM-n wherein n is not an integer power of 2.

Example Embodiment 5. The device of example embodiment 3, wherein the first PAM-n encoding uses a different number n pulse amplitudes from the second PAM-n encoding.

Example Embodiment 6. The device of example embodiment 2, wherein at least a subset of combinations of the first PAM-n encoding and the second PAM-n encoding are unused in the QAM-n constellation map.

Example Embodiment 7. The device of example embodiment 2, wherein:

the QAM-n constellation map corresponds to at least QAM-32 IQ encoding;

the first PAM-n encoding comprises at least PAM-6 encoding;

the second PAM-n encoding comprises at least PAM-6 encoding; and at least four combinations of the first PAM-n encoding and the second PAM-n encoding are unused in the QAM-n constellation map.

Example Embodiment 8. The device of example embodiment 1, wherein the modulator uses a carrier frequency less than or equal to a symbol rate of the IQ data.

Example Embodiment 9. The device of example embodiment 1, comprising:

receiver circuitry to receiver a other in-phase pulse amplitude modulation signal and a other quadrature-phase pulse amplitude modulation signal across the wireline channel from a remote transmitter, wherein the other in-phase pulse amplitude modulation signal is different by 90° from the other quadrature-phase pulse amplitude modulation signal such that the receiver detects the other in-phase pulse amplitude modulation signal independently of the other quadrature-phase pulse amplitude modulation signal;

demodulator circuitry to determine a received in-phase component of received IQ data based on the other in-phase pulse amplitude modulation signal and determine a received quadrature-phase component of the received IQ data based on the other quadrature-phase pulse amplitude modulation signal; and decoder circuitry to map the received IQ data to an output bit stream.

Example Embodiment 10. A wireline receiver system comprising:

receiver circuitry to receiver an in-phase pulse amplitude modulation signal and a other quadrature-phase pulse amplitude modulation signal from a wireline channel, wherein the in-phase pulse amplitude modulation signal is different by 90° from the quadrature-phase pulse amplitude modulation signal such that the receiver detects the in-phase pulse amplitude modulation signal substantially independently of the quadrature-phase pulse amplitude modulation signal;

demodulator circuitry to determine a received in-phase component of IQ data based on the in-phase pulse amplitude modulation signal and determine a received quadrature-phase component of the IQ data based on the quadrature-phase pulse amplitude modulation signal; and decoder circuitry to map the received IQ data to an output bit stream.

Example Embodiment 11. An electronic device comprising:

IQ encoding circuitry to receive an input bit stream and generate IQ data based on the input bit stream;

baseband modulator circuitry to generate a signal transmissible on a first channel based on the IQ data; and passband modulator circuitry to generate a signal transmissible on a second channel of a different type from the first channel based on the IQ data.

Example Embodiment 12. The device of example embodiment 11, wherein the baseband modulator generates the signal transmissible on the first channel at least in part by converting the IQ data to a pair of PAM-n signals that are different from one another by 90°.

Example Embodiment 13. The device of example embodiment 11, wherein the passband modulator circuitry generates the signal transmissible on the second channel at least in part by converting the IQ data to a QAM-n signal.

Example Embodiment 14. The device of example embodiment 11, wherein the first channel comprises a wireline channel.

Example Embodiment 15. The device of example embodiment 11, wherein the second channel comprises a wireless channel, a fiber optic channel, or a coaxial channel.

Example Embodiment 16. A wireless extender system to bridge between a first wireline and a second wireline, the wireless extender system comprising:
 a first electronic device to receive IQ data as pairs of PAM-n signals over the first wireline and retransmit the IQ data over a wireless channel as a wireless QAM signal; and
 a second electronic device to receive the IQ data as the wireless QAM signal over the wireless channel and retransmit the IQ data over the second wireline as the pairs of PAM-n signals.

Example Embodiment 17. The system of example embodiment 16, wherein the first electronic device and the second electronic device receive and retransmit the IQ data without decoding the IQ data.

Example Embodiment 18. A wireline extender system to bridge between a first wireless channel and a second wireless channel, the wireless extender system comprising:
 a first electronic device to receive IQ data over the first wireless channel as a first wireless QAM signal and retransmit the IQ data over a wireline channel as pairs of PAM-n signals; and
 a second electronic device to receive the IQ data as the pairs of PAM-n signals over the wireline channel and retransmit the IQ data over the second wireless channel as a second wireless QAM signal.

Example Embodiment 19. The system of example embodiment 18, wherein the first electronic device uses QAM demodulation to demodulate the first wireless QAM signal to obtain the IQ data and uses PAM modulation to modulate the IQ data to generate the pairs of PAM-n signals.

Example Embodiment 20. The system of example embodiment 19, wherein the first electronic device comprises:

passband demodulator circuitry to demodulate the first wireless QAM signal to obtain the IQ data; and baseband modulator circuitry to modulate the IQ data to generate the pairs of PAM-n signals.

Example Embodiment 21. The system of example embodiment 20, wherein the first electronic device is configurable to pass the IQ data from the passband demodulator circuitry to the baseband modulator circuitry without decoding the IQ data.

Example Embodiment 22. An electronic device comprising:
 hybrid PAM/QAM receiver circuitry configured to obtain input IQ data based on received pairs of PAM-n signals; and
 hybrid PAM/QAM transmitter circuitry configured to transmit output IQ data as transmitted pairs of PAM-n signals.

The invention claimed is:

1. An electronic device comprising:

encoding circuitry to map data from an input bit stream to IQ data comprising an in-phase component and a quadrature-phase component;

modulator circuitry to determine an in-phase pulse amplitude modulation signal based on the in-phase component and a quadrature-phase pulse amplitude modulation signal based on the quadrature-phase component, wherein the in-phase pulse amplitude modulation signal is different by 90° from the quadrature-phase pulse amplitude modulation signal, wherein the modulator circuitry uses a carrier frequency less than or equal to a symbol rate of the IQ data; and driver circuitry to transmit the in-phase pulse amplitude modulation signal and the quadrature-phase pulse amplitude modulation signal across a wireline channel, wherein the in-phase pulse amplitude modulation signal is different by 90° from the quadrature-phase pulse amplitude modulation signal to enable a remote receiver on the wireline channel to detect the in-phase pulse amplitude modulation signal independently of the quadrature-phase pulse amplitude modulation signal.

2. The device of claim 1, wherein the encoding circuitry maps the data from the input bit stream to the IQ data according to a QAM-n constellation map.

3. The device of claim 2, wherein the QAM-n constellation map corresponds to a first PAM-n encoding corresponding to the in-phase component of the IQ data and a second PAM-n encoding corresponding to the quadrature-phase component of the IQ data.

4. The device of claim 3, wherein the first PAM-n encoding or the second PAM-n encoding, or both, comprise a version of PAM-n wherein n is not an integer power of 2.

5. The device of claim 3, wherein the first PAM-n encoding uses a different number n pulse amplitudes from the second PAM-n encoding.

6. The device of claim 3, wherein at least a subset of combinations of the first PAM-n encoding and the second PAM-n encoding are unused in the QAM-n constellation map.

7. The device of claim 3, wherein:
the QAM-n constellation map corresponds to at least QAM-32 IQ encoding;
the first PAM-n encoding comprises at least PAM-6 encoding;
the second PAM-n encoding comprises at least PAM-6 encoding; and
at least four combinations of the first PAM-n encoding and the second PAM-n encoding are unused in the QAM-n constellation map.

8. The device of claim 1, comprising:
receiver circuitry to receive another in-phase pulse amplitude modulation signal and another quadrature-phase pulse amplitude modulation signal across the wireline channel from a remote transmitter, wherein the other in-phase pulse amplitude modulation signal is different by 90° from the other quadrature-phase pulse amplitude modulation signal such that the receiver detects the other in-phase pulse amplitude modulation signal independently of the other quadrature-phase pulse amplitude modulation signal;
demodulator circuitry to determine a received in-phase component of received IQ data based on the other in-phase pulse amplitude modulation signal and determine a received quadrature-phase component of the received IQ data based on the other quadrature-phase pulse amplitude modulation signal; and
decoder circuitry to map the received IQ data to an output bit stream.

9. A wireline receiver system comprising:
receiver circuitry to receiver an in-phase pulse amplitude modulation signal and a quadrature-phase pulse amplitude modulation signal from a wireline channel, wherein the in-phase pulse amplitude modulation signal is different by 90° from the quadrature-phase pulse amplitude modulation signal such that the receiver detects the in-phase pulse amplitude modulation signal substantially independently of the quadrature-phase pulse amplitude modulation signal;
demodulator circuitry to determine a received in-phase component of IQ data based on the in-phase pulse amplitude modulation signal and determine a received quadrature-phase component of the IQ data based on the quadrature-phase pulse amplitude modulation signal, wherein the demodulator circuitry uses a carrier frequency less than or equal to a symbol rate of the received IQ data; and
decoder circuitry to map the received IQ data to an output bit stream.

10. An electronic device comprising:
IQ encoding circuitry to receive an input bit stream and generate IQ data based on the input bit stream;
baseband modulator circuitry to generate a signal transmissible on a first channel based on the IQ data; and
passband modulator circuitry to generate a signal transmissible on a second channel of a different type from the first channel based on the IQ data.

11. The device of claim 10, wherein the baseband modulator generates the signal transmissible on the first channel at least in part by converting the IQ data to a pair of PAM-n signals that are different from one another by 90°.

12. The device of claim 10, wherein the passband modulator circuitry generates the signal transmissible on the second channel at least in part by converting the IQ data to a QAM-n signal.

13. The device of claim 10, wherein the first channel comprises a wireline channel.

14. The device of claim 10, wherein the second channel comprises a wireless channel, a fiber optic channel, or a coaxial channel.

15. A wireless extender system to bridge between a first wireline and a second wireline, the wireless extender system comprising:
a first electronic device to receive IQ data as pairs of PAM-n signals over the first wireline and retransmit the IQ data over a wireless channel as a wireless QAM signal; and
a second electronic device to receive the IQ data as the wireless QAM signal over the wireless channel and retransmit the IQ data over the second wireline as the pairs of PAM-n signals.

16. The system of claim 15, wherein the first electronic device and the second electronic device receive and retransmit the IQ data without decoding the IQ data.

17. A wireline extender system to bridge between a first wireless channel and a second wireless channel, the wireless extender system comprising:
a first electronic device to receive IQ data over the first wireless channel as a first wireless QAM signal and retransmit the IQ data over a wireline channel as pairs of PAM-n signals; and
a second electronic device to receive the IQ data as the pairs of PAM-n signals over the wireline channel and retransmit the IQ data over the second wireless channel as a second wireless QAM signal.

18. The system of claim 17, wherein the first electronic device uses QAM demodulation to demodulate the first wireless QAM signal to obtain the IQ data and uses PAM modulation to modulate the IQ data to generate the pairs of PAM-n signals.

19. The system of claim 18, wherein the first electronic device comprises:
passband demodulator circuitry to demodulate the first wireless QAM signal to obtain the IQ data; and
baseband modulator circuitry to modulate the IQ data to generate the pairs of PAM-n signals.

20. The system of claim 19, wherein the first electronic device is configurable to pass the IQ data from the passband demodulator circuitry to the baseband modulator circuitry without decoding the IQ data.

21. An electronic device comprising:
hybrid PAM/QAM receiver circuitry configured to obtain input IQ data based on received pairs of PAM-n signals; and
hybrid PAM/QAM transmitter circuitry configured to transmit output IQ data as transmitted pairs of PAM-n signals using a carrier frequency less than or equal to a symbol rate of the IQ data.

22. The electronic device of claim 21, comprising:
a multiplexer to transmit a bit stream into a PAM encoding circuit of the hybrid PAM/QAM transmitter circuitry or a QAM encoding circuit of the hybrid PAM/QAM transmitter circuitry.

\* \* \* \* \*